United States Patent
Rocas

(10) Patent No.: US 8,928,917 B2
(45) Date of Patent: Jan. 6, 2015

(54) METHOD AND SYSTEM FOR WIRELESSLY ACTIVATING OR DEACTIVATING FEATURES THAT ARE SAFETY ISSUES ASSOCIATED WITH A MOBILE MULTI-FUNCTION DEVICE USER INTERFACE

(71) Applicant: Xerox Corporation, Norwalk, CT (US)

(72) Inventor: Marc Rocas, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 32 days.

(21) Appl. No.: 13/672,441

(22) Filed: Nov. 8, 2012

(65) Prior Publication Data

US 2014/0126010 A1     May 8, 2014

(51) Int. Cl.
*G06F 3/12*     (2006.01)
*G06K 15/00*   (2006.01)
*G06F 3/01*     (2006.01)

(52) U.S. Cl.
CPC ........................................ *G06F 3/01* (2013.01)
USPC .......................... 358/1.15; 358/1.13; 358/1.14

(58) Field of Classification Search
CPC ............................ G06F 3/1204; H04M 1/0256
See application file for complete search history.

(56) References Cited

U.S. PATENT DOCUMENTS

| | | | |
|---|---|---|---|
| 7,715,037 B2 | 5/2010 | Castellani et al. | 358/1.15 |
| 7,738,127 B2 * | 6/2010 | Winkel et al. | 358/1.15 |
| 7,973,657 B2 | 7/2011 | Ayed | 340/539.23 |
| 8,154,752 B2 | 4/2012 | Shaw et al. | 358/1.15 |
| 2003/0055735 A1 | 3/2003 | Cameron et al. | 705/26 |
| 2006/0046709 A1 | 3/2006 | Krumm et al. | 455/422.1 |
| 2008/0007767 A1* | 1/2008 | Ishimaru | 358/1.15 |
| 2008/0104044 A1 | 5/2008 | Kardamilas et al. | 707/4 |
| 2008/0126261 A1 | 5/2008 | Lovett | 705/72 |
| 2010/0094925 A1 | 4/2010 | St Jacques, Jr. et al. | 709/202 |
| 2010/0110472 A1 | 5/2010 | Harrington | 358/1.15 |
| 2010/0110473 A1 | 5/2010 | Harrington | 358/1.15 |
| 2010/0149572 A1 | 6/2010 | St. Jacques et al. | 358/1.13 |
| 2010/0268591 A1 | 10/2010 | Gnanasambandam et al. | 705/14.37 |
| 2011/0080613 A1 | 4/2011 | Mathur | 358/1.15 |
| 2011/0283230 A1 | 11/2011 | Gnanasambandam et al. | 715/810 |
| 2012/0033248 A1 | 2/2012 | Farrell | 358/1.15 |

* cited by examiner

*Primary Examiner* — Thomas Lett
(74) *Attorney, Agent, or Firm* — Kermit D. Lopez; Luis M. Ortiz; Ortiz & Lopez, PLLC

(57) ABSTRACT

A system and method for wirelessly activating or deactivating features that are safety issues associated with a mobile multi-function device user interface based on user proximity. A mobile telecommunication device configured with a mobile multifunction device user interface can be paired with a multifunction device utilizing a wireless communication link (e.g., Bluetooth). A proximity detection mechanism with respect to the wireless communication link can be configured in association with the mobile telecommunication device to set a user proximity range. A permanently disabled feature due to safety concerns can be automatically enabled when the mobile user interface device is within the programmed range. The features can be automatically disabled if the mobile user interface device is out of range. Such an approach controls the device functionality based on the user proximity for correct and safe operation of the device.

14 Claims, 9 Drawing Sheets

METHOD AND SYSTEM FOR WIRELESSLY ACTIVATING OR DEACTIVATING FEATURES THAT ARE SAFETY ISSUES ASSOCIATED WITH A MOBILE MULTI-FUNCTION DEVICE USER INTERFACE

TECHNICAL FIELD

Embodiments are generally related to MFD (Multi-Function Device) systems, methods, and components. Embodiments are additionally related to MFD's, such as, for example, copy machines, scanners, printers, etc. Embodiments are further related to UI (User Interface) devices, applications and components associated with an MFD. Embodiments are also related to remote UI devices, applications and components for use with an MFD.

BACKGROUND OF THE INVENTION

Modern document processing devices include copiers, printers, e-mail gateways, facsimile machines, and scanners. Many devices include two or more of these functions, and are referred to as multifunction peripherals (MFPs) or multifunction devices (MFDs). Document processing devices, particularly MFPs, often include embedded computers, referred to as controllers, to perform functions such as device control, data communication, user interface generation, device maintenance, and checking of device status.

Document processing devices typically rely on integrated user interfaces to allow users to view device options and select desired operations. The display is typically generated by the integrated controller, which also serves to receive user instructions and control the document processing device to complete the desired operations. User interfaces may include a keyboard and display, a mouse or other cursor control, a touch screen, or any other suitable man-machine interface. This interface allows a user to select one or more operations, such as printing, copying, scanning, faxing, e-mailing, and the like. The interface also allows for input of a destination, such as fax or network destinations. Additionally, a user can select options such as a number of copies, document finishing options, such as hole punching, collation or stapling. Since a document processing device typically has a single control interface, operation by users is typically relegated to one user who has control of the interface at a given time.

The user interface panel physically attached to the multi-function device is known as a local user interface. The multifunction device user interface that is off-box, not local, is considered as a remote user interface. The remote user interface that can control the multifunction device includes features that represent safety issues that need to be permanently disabled. In particular, the multifunction device and the remote user interface are unaware of the distance between them and as such, a remote user interface user may not be within a visual distance of the device to realize whether a given control command may be a safety issue to the user operating or troubleshooting the multifunction device.

With the advent of mobile telecommunication devices (e.g., phones or tablets) and the pursuit of mobile user interfaces for multifunction devices, the permanent disablement of the features due to safety concerns if the mobile user interface user is not within a visual distance of the device is inadequate since the user may be at the device. For example, the user may be at the device completing a job started on the mobile user interface and waiting to pick it up and/or a technician servicing the device utilizing the user interface running on the mobile communication device to expedite a service procedure.

Based on the foregoing, it is believed that a need exists for an improved system and method for automatically and wirelessly activating or deactivating features that are safety issues associated with a mobile multi-function device user interface, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and system for controlling a document processing device via a remote device user interface.

It is another aspect of the disclosed embodiments to provide for a methods and systems for automatically and wirelessly activating or deactivating features that are safety issues associated with a mobile multifunction device user interface based on user proximity.

The aforementioned aspects and other objectives and advantages can now be achieved as described herein. A system and method for automatically and wirelessly activating or deactivating features that are safety issues associated with a mobile multi-function device user interface based on user proximity, is disclosed herein. A mobile telecommunication device configured with a mobile multifunction device user interface can be paired with a multifunction device utilizing a wireless communication link (e.g., Bluetooth). A proximity detection mechanism with respect to the wireless communication link can be configured in association with the mobile telecommunication device to set a user proximity range. An otherwise permanently disabled feature due to safety concerns can be automatically enabled when the mobile user interface device is within the programmed user proximity range. The features can be automatically disabled if the mobile user interface device is out of range. Such an approach controls the device functionality based on the user proximity for correct and safe operation of the device.

The proximity detection mechanism determines the distance between the multi-function device and the mobile multifunction device user interface. The automatic enable/disable feature based on the user proximity can facilitate the user having full user interface access to the device so long as the user interface mobile device is within visual range of the multifunction device. The safety of the multifunction device features depends on the user proximity, so that the feature cannot be enabled remotely if the user is not physically attending the machine.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
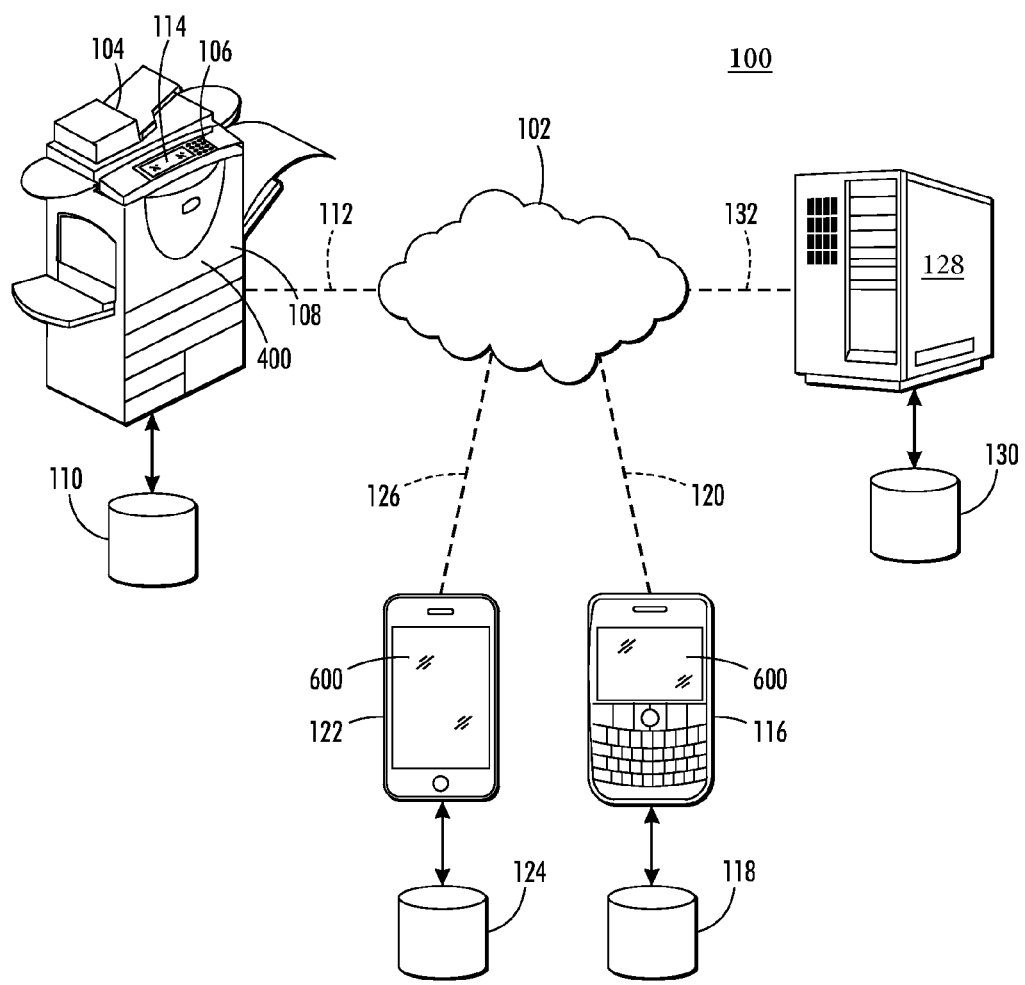
FIG. 1 illustrates an overall diagram of a system for controlling a document processing device via a remote device interface according to one embodiment of the subject application.

Referring now to FIG. 1, there is shown an overall diagram of a type of system 100 for controlling a document processing device via a remote device interface in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof.

In accordance with a preferred embodiment of the subject application, the computer network 102 can include physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as an MFD suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art.

In accordance with one embodiment, the user interface 106 can include a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 can incorporate a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for obtaining address data from a portable device to a document processing device.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, document data, image data, electronic database data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like. The document processing device of FIG. 1 also includes a portable storage device reader 114, which is suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

Also depicted in FIG. 1 is a plurality of user devices, illustrated as portable telecommunications devices 116 and 122. Each portable telecommunications device 116 and 122 is preferably in data communication with the document processing device 104 via corresponding communications links 120 and 126. It will be appreciated by those skilled in the art that the portable telecommunication devices 116 and 122 are shown in FIG. 1 as a smart cellular telephone and a portable electronic book reading device for illustration purposes only. As will be understood by those skilled in the art, the portable telecommunication devices 116 and 122 are representative of any personal computing device known in the art including, for example and without limitation, a laptop computer, a personal computer, a personal data assistant, a web-enabled cellular telephone, a smart phone, a proprietary network device, or other web-enabled electronic device. According to one embodiment of the subject application, the portable telecommunication devices 116 and 122 further include software, hardware, or a suitable combination thereof configured to interact with the document processing device 104 or the like. Preferably, each portable telecommunication device 116 and 122 includes a suitable personal area network interface, such as a BLUETOOTH transceiver, an RF transceiver, and the like.

The communications links 120 and 126 are any suitable channel of data communications known in the art including, but not limited to wireless communications, for example and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Preferably, the portable telecommunication devices 116 and 122 are suitably adapted to provide contact information, address book data, document data, job data, user interface data, image data, monitor document processing jobs, employ thin-client interfaces, generate display data, generate output data, or the like, with respect to the document processing device 104, or any other similar device with which the portable telecommunication devices 116 and 122 are capable of communicating. According to one embodiment of the subject application, the portable telecommunication devices 116 and 122 are capable of implementing various graphical user interface applications for interacting with a user, as will be appreciated by those skilled in the art to include a physical keyboard, a soft keyboard via an associated touch screen interface, or a suitable combination thereof. The functioning of the portable telecommunication devices 116 and 122 will better be understood in conjunction with the block diagram illustrated in FIG. 6, explained in greater detail below.

Communicatively coupled to the portable telecommunication devices 116 and 122 are data storage devices 118 and 124, respectively. According to the foregoing example embodiment, the data storage devices 118 and 124 are any mass storage device, or plurality of such devices, known in the art including, for example and without limitation, magnetic storage drives, a hard disk drive, optical storage devices, flash memory devices, or any suitable combination thereof. In such an embodiment, the data storage devices 118 and 124 are suitably adapted to store operating systems, address book data, personal information, account information, identification data, regional data, thin client interface data, keyboard layout data, keyboard property data, HTML keyboard data, JavaScript keyboard data, update software, policy information, and the like.

It will be appreciated by those skilled in the art that while illustrated in FIG. 1 as being a separate component of the system 100, the data storage devices 118 and 124 are capable of being implemented as an internal storage component of the portable telecommunication devices 116 and 122.

The system 100 illustrated in FIG. 1 further depicts a backend component, shown as the server 128, in data communication with the computer network 102 via a communications link 132. It will be appreciated by those skilled in the art that the server 128 is shown in FIG. 1 as a component of the system 100 for example purposes only, and the subject application is capable of implementation without the use of a separate backend server component, e.g. the server 128 is capable of implementation via the document processing device 104, or via one of a plurality of portable devices 116 and 122. The skilled artisan will appreciate that the server 128 comprises hardware, software, and combinations thereof suitably adapted to provide one or more services, web-based applications, communication with thin client interfaces, storage options, and the like, to networked devices. In accordance with one example embodiment of the subject application, the server 128 includes various components, implemented as hardware, software, or a combination thereof, for managing retention of secured documents, text data, performing searches, comparisons, maintaining database entries, account information, receiving payment data, retrieval of documents, and the like, which are accessed via the computer network 102.

The communications link 132 is any suitable data communications means known in the art including, but not limited to wireless communications comprising, for example and without limitation Bluetooth, WiMax, 802.11a, 802.11b, 802.11g, 802.11(x), a proprietary communications network, infrared, the public switched telephone network, optical, or any suitable wireless data transmission system, or wired communications known in the art. It will further be appreciated by those skilled in the art that the components described with respect to the server 128 are capable of implementation on any suitable computing device coupled to the computer network 102, e.g. the controller 108, or the like.

Communicatively coupled to the server 128 is the data storage device 130. According to the foregoing example embodiment, the data storage device 130 is any mass storage device, or plurality of such devices, known in the art including, for example and without limitation, magnetic storage drives, a hard disk drive, optical storage devices, flash memory devices, or any suitable combination thereof. In such an embodiment, the data storage device 130 is suitably adapted to store account information, document processing device identification data, client device identification data, regional data, thin client interface data, keyboard layout data, keyboard property data, HTML keyboard data, JavaScript keyboard data, update software, policy information, and the like. It will be appreciated by those skilled in the art that while illustrated in FIG. 1 as being a separate component of the system 100, the data storage device 130 is capable of being implemented as an internal storage component of the server 128, or the like, such as, for example and without limitation, an internal hard disk drive, or the like.

Figure 2:
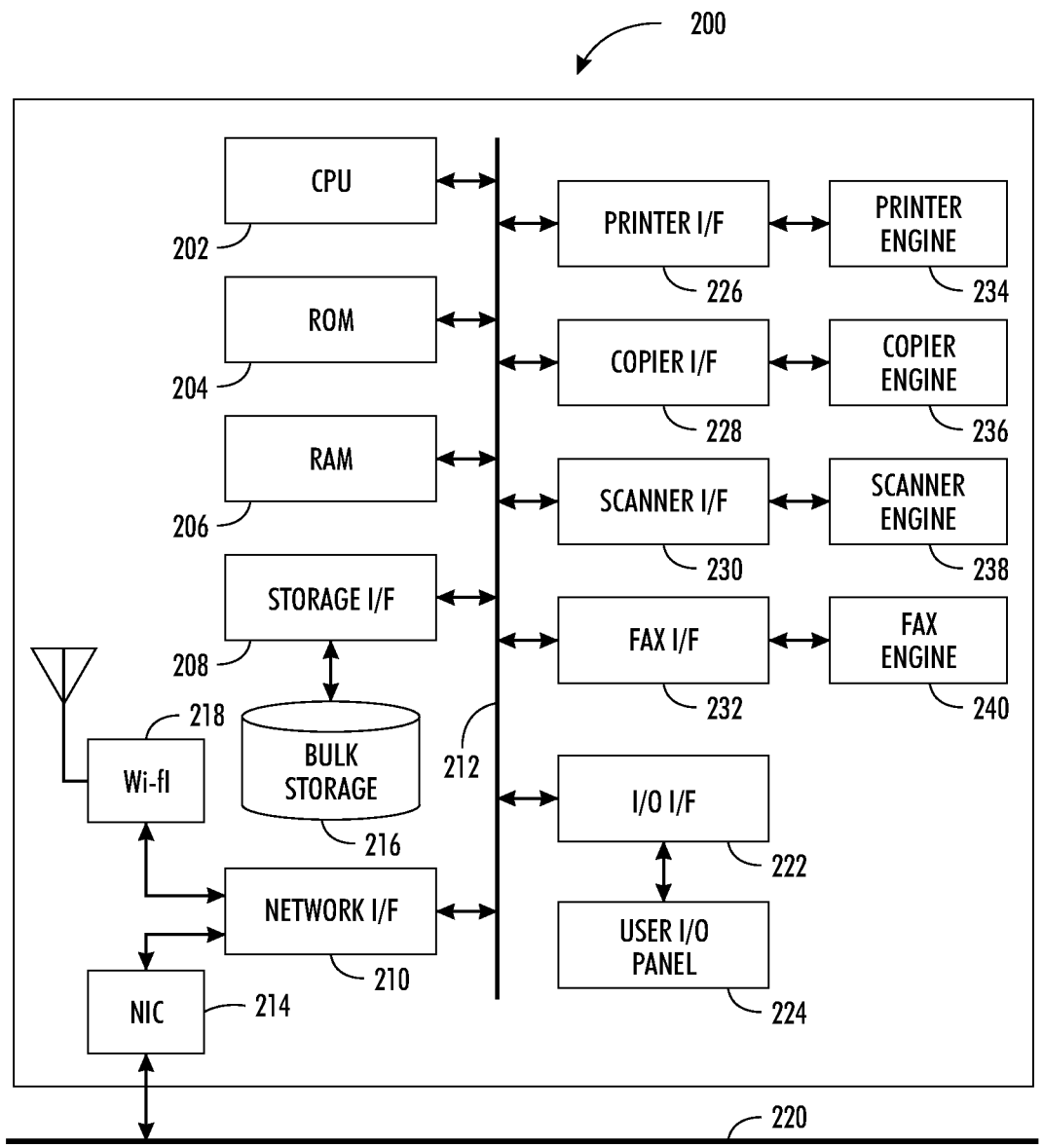
FIG. 2 illustrates a block diagram depicting device hardware for use in the system for controlling a document processing device via a remote device interface according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document rendering devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
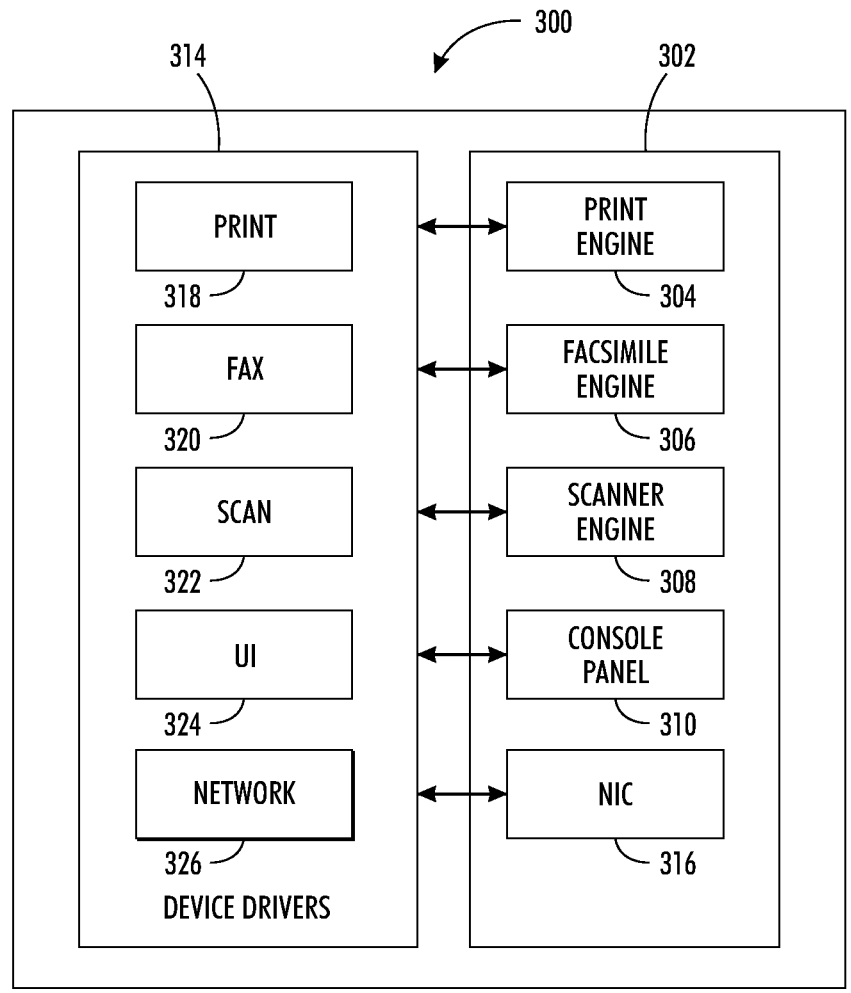
FIG. 3 illustrates a functional diagram illustrating the device for use in the system for controlling a document processing device via a remote device interface according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document rendering device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
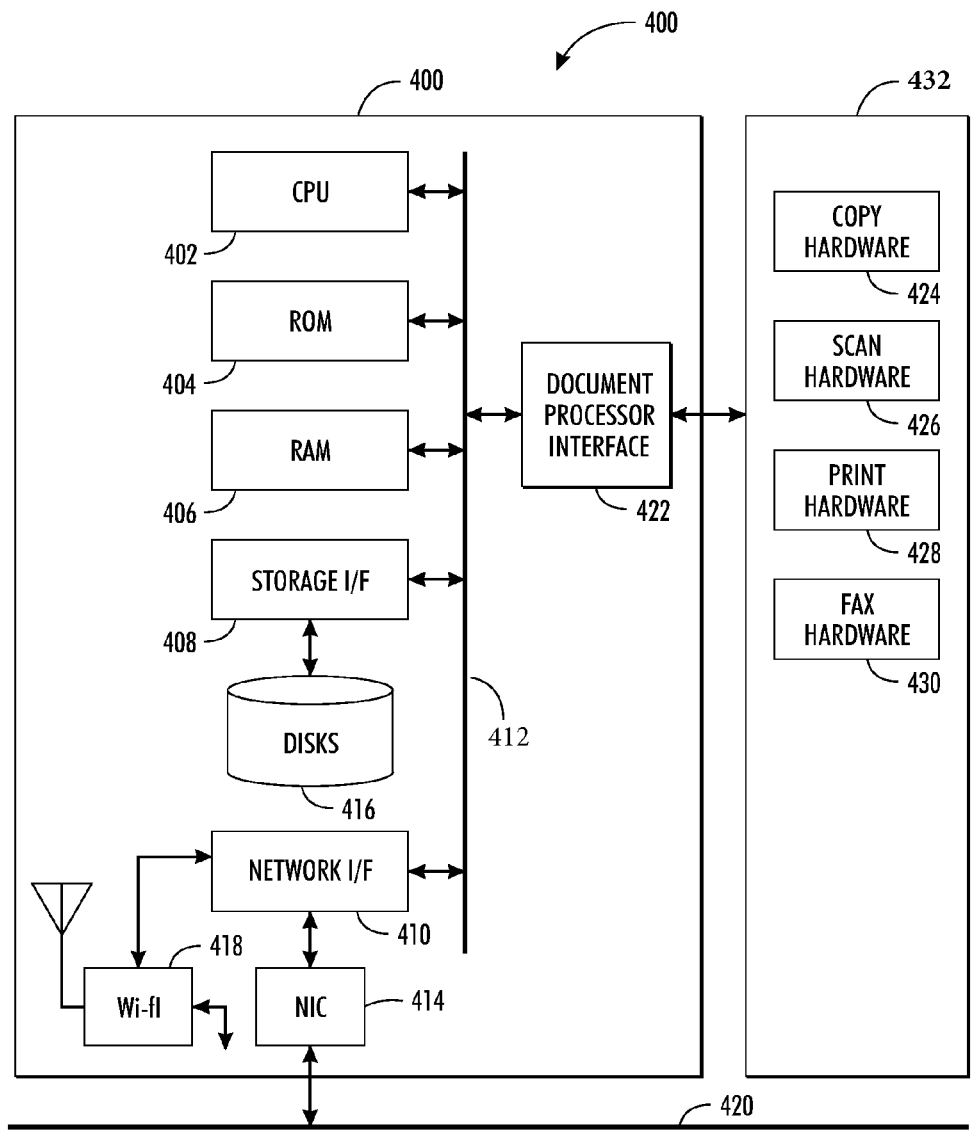
FIG. 4 illustrates a block diagram depicting controller hardware for use in the system for controlling a document processing device via a remote device interface according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
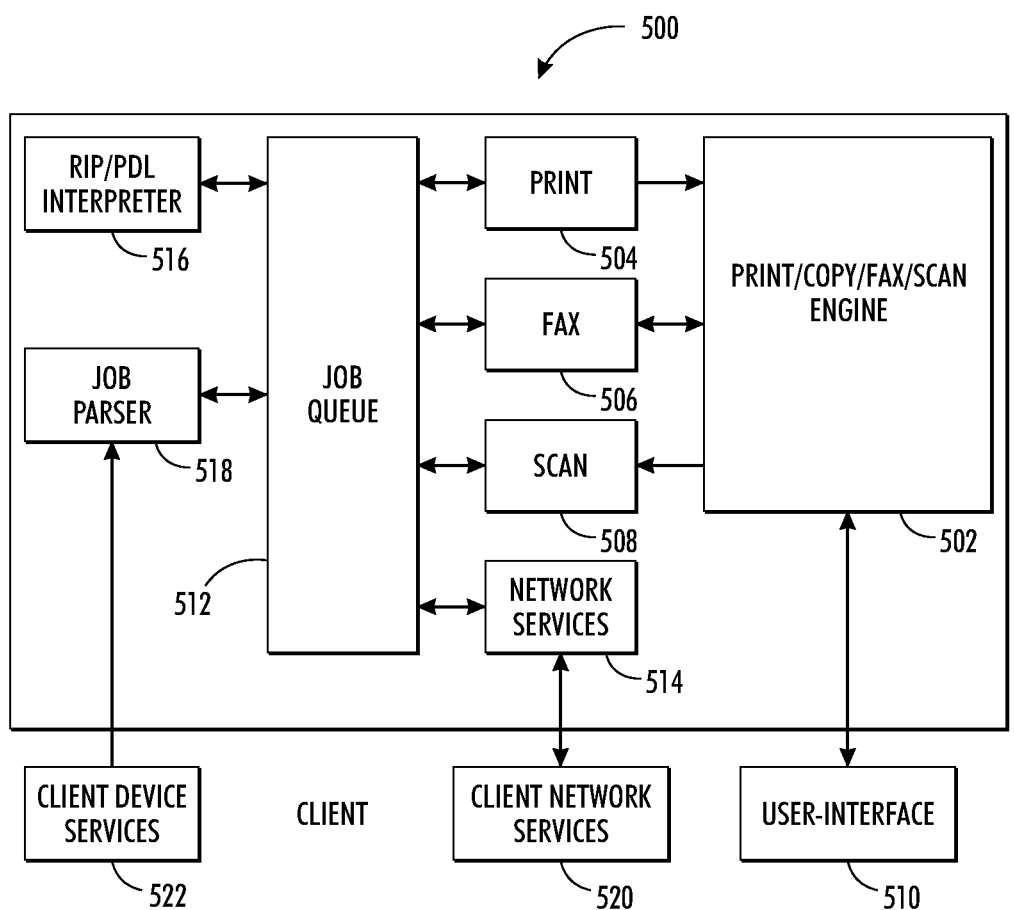
FIG. 5 illustrates a functional diagram depicting the controller for use in the system for controlling a document processing device via a remote device interface according to one embodiment of the subject application.

Functionality of the subject system 100 can be accomplished on a suitable document rendering device, such as, for example, the document processing device 104, which includes the controller 400 of FIG. 4, (shown in FIG. 1 as the controller 108) as an intelligent subsystem associated with a document rendering device. In the illustration of FIG. 5, controller function 500 in the preferred embodiment includes a document processing engine 502. A suitable controller functionality is incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In one embodiment, the engine 502 can be configured to allow for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document rendering devices that perform one or more of the document processing operations listed above.

The engine 502 can be suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 508 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
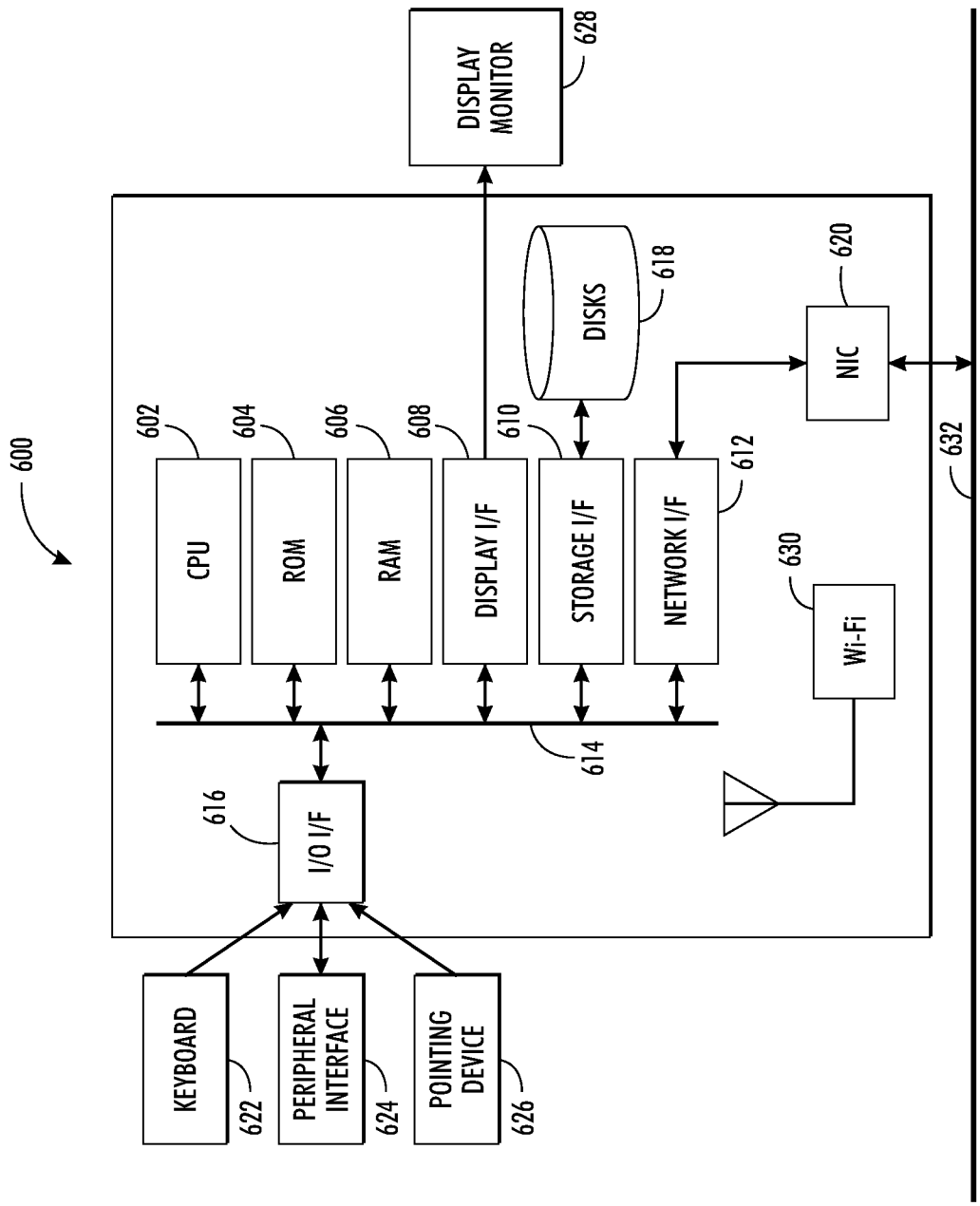
FIG. 6 illustrates a block diagram depicting a workstation for controlling a document processing device via a remote device interface according to one embodiment of the subject application.

Turning now to FIG. 6, illustrated is a hardware diagram of a suitable workstation 600, shown in FIG. 1 as the portable telecommunication devices 116 and 122 or the workstation 128, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (e.g., IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
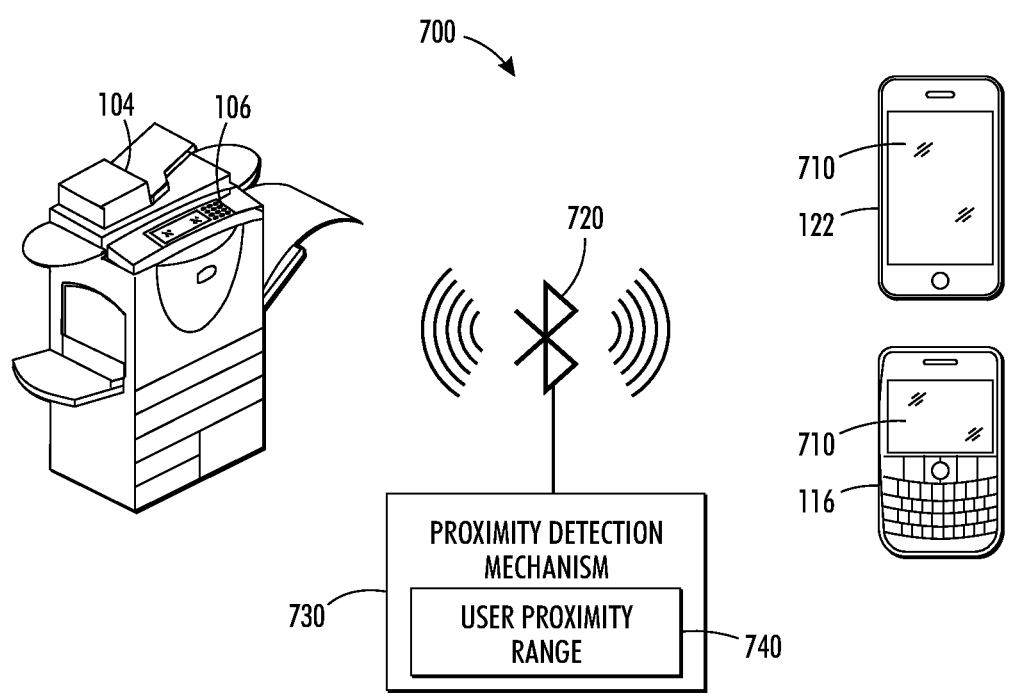
FIG. 7 illustrates a block diagram of a user proximity detection system for wirelessly activating or deactivating features that are safety issues associated with a mobile multi-function device user interface, in accordance with the disclosed embodiments.

FIG. 7 illustrates a block diagram of a user proximity detection system 700 for wirelessly activating or deactivating features that are safety issues associated with a mobile multi-function device user interface 710, in accordance with the disclosed embodiments. The mobile telecommunication device 116 and 122 configured with the mobile multi-function device user interface 710 can be paired with the multi-function device 104 utilizing a wireless communication link 720. The communications link 720 is any suitable data communications means known in the art including, but not limited to wireless communications comprising, for example and without limitation Bluetooth, or any suitable wireless data transmission system known in the art.

In general, Bluetooth technology permits electronic devices to communicate wirelessly. Bluetooth is a proprietary open wireless technology standard for exchanging data over short distances (using short-wavelength radio transmissions in the ISM band from 2400-2480 MHz) from fixed and mobile devices, creating personal area networks (PANs) with high levels of security. Bluetooth technology connect several devices, overcoming problems of synchronization.

A proximity detection mechanism 730 with respect to the wireless communication link 710 can be configured in association with the mobile telecommunication device 116 and 122 to set a user proximity range 740. The proximity detection mechanism 730 determines the distance between the multi-function device 104 and the telecommunication device 116 and 122 user. A permanently disabled feature due to safety concerns can be automatically enabled when the telecommunication user interface device 116 and 122 is within the programmed range 740. The features can be automatically disabled if the telecommunication user interface device 116 and 122 is out of range 740.

Figure 8:
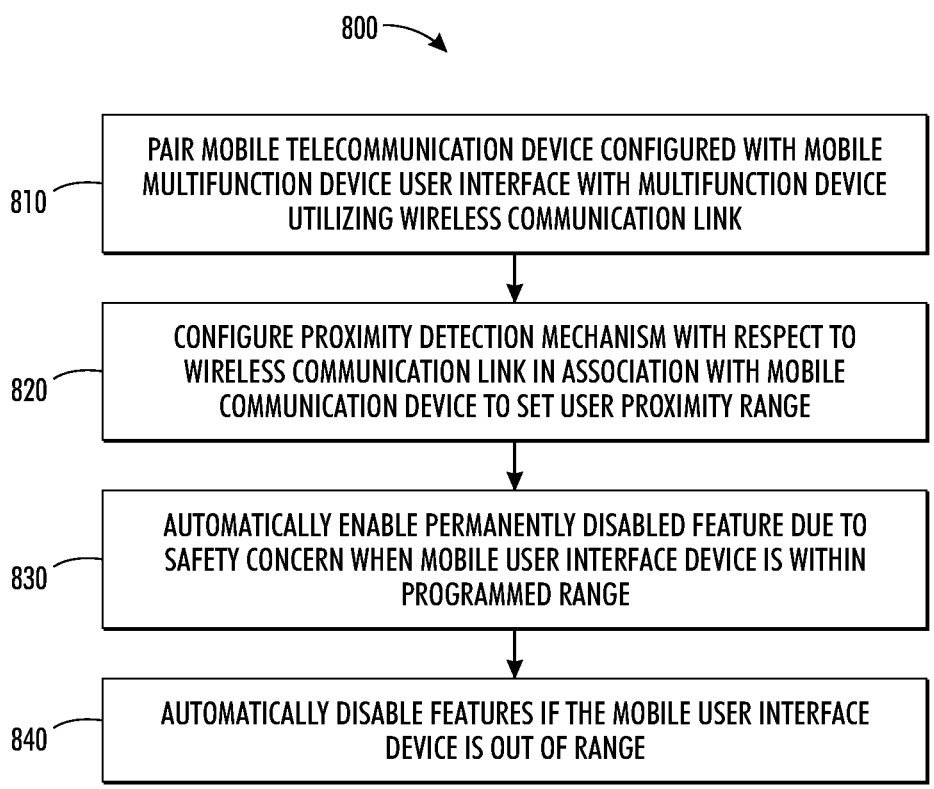
FIG. 8 illustrates a high level flow chart of operations illustrating logical operational steps of a method for wirelessly activating or deactivating features that are safety issues associated with the mobile multi-function device user interface, in accordance with the disclosed embodiments.

FIG. 8 illustrates a high level flow chart of operations illustrating logical operational steps of a method 800 for wirelessly activating or deactivating features that are safety issues associated with the mobile multi-function device user interface 710, in accordance with the disclosed embodiments. Initially, as indicated at block 810, the mobile telecommunication device 116 and 122 configured with the mobile MFD user interface 710 can be paired with the multi-function device 104 utilizing the wireless communication link 720. The proximity detection mechanism 730 with respect to the wireless communication link 720 can be configured in association with the mobile telecommunication device 116 and 122 to set a user proximity range 740, as depicted at block 820. A permanently disabled feature due to safety concerns can be automatically enabled when the telecommunication user interface device 116 and 122 is within the programmed range 740, as shown at block 830. The features can be automatically disabled if the telecommunication user interface device 116 and 122 is out of range 740, as illustrated at block 840.

The automatic enable/disable feature based on the user proximity can facilitate the user having full user interface access to the multifunction device 104 so long as the user interface 710 is within visual range 740 of the multifunction device 104. The safety of the multifunction device 104 features depends on the user proximity, so that the features cannot be enabled remotely if the user is not physically attending the multifunction device 104. Such an approach controls the device functionality based on the user proximity for correct and safe operation of the multifunction device 104.

As will be appreciated by one of skill in the art, the disclosed embodiments can be implemented as a method, data-processing system, or computer program product. Accordingly, the embodiments may take the form of an entirely hardware implementation, an entirely software embodiment or an embodiment combining software and hardware aspects all generally referred to as a "circuit" or "module." Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.) The computer program code, however, for carrying out operations of the present invention may also be written in conventional procedural programming languages, such as the "C" programming language or in a visually oriented programming environment, such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine, such that the instructions, which execute via the processor of the computer or other programmable data-processing apparatus, create means for implementing the functions/acts specified in the block or blocks discussed herein, such as, for example, the various instructions shown with respect to particular blocks in FIGS. 3, 4, 6, 7, 8.

These computer program instructions may also be stored in a computer-readable memory that can direct a computer or other programmable data-processing apparatus to function in a particular manner, such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 9:
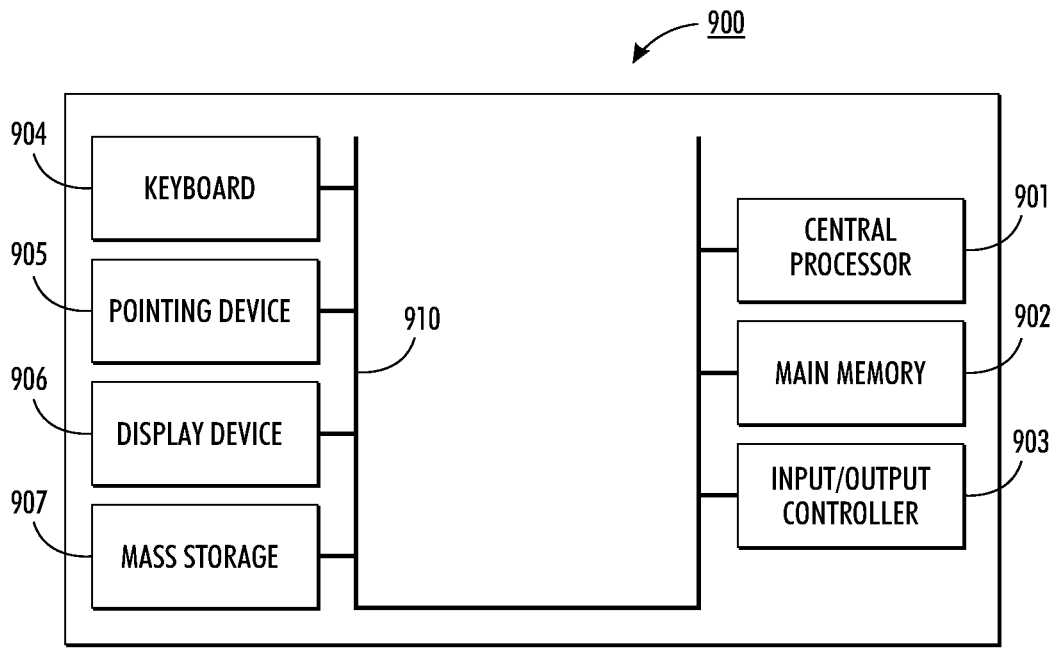
FIG. 9 illustrates a schematic view of a computer system, in accordance with the disclosed embodiments.
Figure 10:
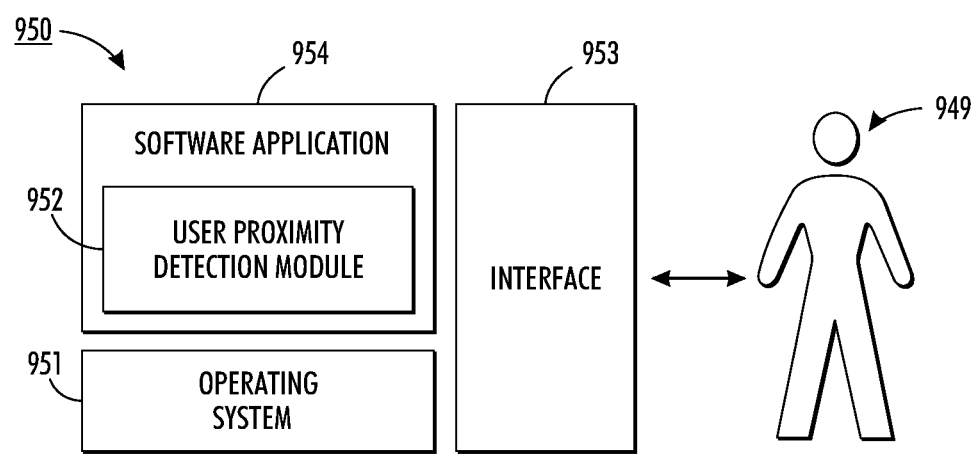
FIG. 10 illustrates a schematic view of a software system including a user proximity detection module, an operating system, and a user interface, in accordance with the disclosed embodiments.

FIGS. 9-10 are provided as exemplary diagrams of data-processing environments in which embodiments of the present invention may be implemented. It should be appreciated that FIG. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, the disclosed embodiments may be implemented in the context of a data-processing system 900 that includes, for example, a central processor 901 (or other processors), a main memory 902, an input/output controller 903, and in some embodiments, a USB (Universal Serial Bus) or other appropriate peripheral connection. System 900 can also include a keyboard 904, an input device 905 (e.g., a pointing device, such as a mouse, track ball, pen device, etc), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc.

FIG. 10 illustrates a computer software system 950, which may be employed for directing the operation of the data-processing system 900 depicted in FIG. 9. Software application 954, stored in main memory 902 and on mass storage 907 shown in FIG. 6, generally includes and/or is associated with a kernel or operating system 951 and a shell or interface 953. One or more application programs, such as module(s) 952, may be "loaded" (i.e., transferred from mass storage 907 into the main memory 902) for execution by the data-processing system 900. The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules (e.g., module 952) can include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 953 (e.g., a graphical user interface) can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operation systems, such as, for example, a real time operating system (RTOS) more commonly employed in wireless systems may also be employed with respect to operating system 951 and interface 953. The software application 954 can include, for example, user proximity detection module 952, which can include instructions for carrying out steps or logical operations such as those shown in FIGS. 2, 3, 4, 6, 7, and 8 herein.

FIGS. 9-10 are thus intended as examples, and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for wirelessly activating or deactivating features that are safety issues, comprising:
    pairing a mobile telecommunications device with a multifunction device utilizing a wireless communication link;
    configuring a proximity detection mechanism that determines a distance between said multifunction device and said mobile telecommunications device with respect to said wireless communications link in association with said mobile telecommunications device to designate a proximity range, wherein said proximity range indicates a distance limit between said multifunction device and said telecommunications device for enabling or disabling a feature with respect to said multifunction device; and
    automatically enabling or disabling said feature with respect to said multifunction device due to a safety concern when said mobile telecommunications device is within said proximity range, thereby controlling a functionality of said multifunction device based on said proximity range of said multifunction device.

2. The method of claim 1 further comprising automatically enabling said disabling feature with respect to said safety concern if said mobile telecommunications is out of said range of said multifunction device.

3. The method of claim 2 further comprising determining a distance between said multifunction device and said mobile telecommunications device utilizing said proximity detection mechanism.

4. The method of claim 2 further comprising automatically enabling and disabling said disabling feature based on said proximity range to facilitate a user interface access to said multifunction device so long as said user interface is within a visual range of said multifunction device.

5. The method of claim 1 further comprising automatically enabling and disabling said disabling feature based on said proximity range to facilitate a user interface access to said multifunction device so long as said user interface is within a visual range of said multifunction device.

6. The method of claim 5 further comprising determining a distance between said multifunction device and said mobile telecommunications device utilizing said proximity detection mechanism.

7. A system for wirelessly activating or deactivating features that are safety issues, comprising:
    a processor;
    a data bus coupled to said processor; and
    a non-transitory computer-usable medium embodying computer program code, said computer-usable medium being coupled to said data bus, said computer program code comprising program instructions executable by said processor, said program instructions comprising:
        program instructions to pair a mobile telecommunications device with a multifunction device utilizing a wireless communication link;
        program instructions to configure a proximity detection mechanism that determines a distance between said multifunction device and said mobile telecommunications device with respect to said wireless communications link in association with said mobile telecommunications device to designate a proximity range, wherein said proximity range indicates a distance limit between said multifunction device and said telecommunications device for enabling or disabling a feature with resect to said multifunction device; and program instructions to automatically enable or disable said feature with respect to said multifunction device due to a safety concern when said mobile telecommunications device is within said proximity range, thereby controlling a functionality of said multifunction device based on said proximity range of said multifunction device.

8. The system of claim 7 wherein said program instructions further comprise program instructions to automatically enable said disabling feature with respect to said safety concern if said mobile telecommunications is out of said range of said multifunction device.

9. The system of claim 8 wherein said program instructions further comprise program instructions to automatically enable and disable said disabling feature based on said proximity range to facilitate a user interface access to said multifunction device so long as said user interface is within a visual range of said multifunction device.

10. The system of claim 7 wherein said program instructions further comprise program instructions to automatically enable and disable said disabling feature based on said proximity range to facilitate a user interface access to said multifunction device so long as said user interface is within a visual range of said multifunction device.

11. The system of claim 10 wherein said program instructions further comprise program instructions to determine a distance between said multifunction device and said mobile telecommunications device utilizing said proximity detection mechanism.

12. A non-transitory computer readable medium storing computer program code representing program instructions executable by a processor to cause a process to perform a process for wirelessly activating or deactivating features that are safety issues, said program instruction comprising:

program instructions to pair a mobile telecommunications device with a multifunction device utilizing a wireless communication link;

program instructions to configure a proximity detection mechanism that determines a distance between said multifunction device and said mobile telecommunications device with respect to said wireless communications link in association with said mobile telecommunications device to designate a proximity range, wherein said proximity range indicates a distance limit between said multifunction device and said telecommunications device for enabling or disabling a feature with respect to said multifunction device; and program instructions to automatically enable or disable said feature with respect to said multifunction device due to a safety concern when said mobile telecommunications device is within said proximity range, thereby controlling a functionality of said multifunction device based on said proximity range of said multifunction device.

13. The non-transitory computer-readable medium of claim 12 wherein said code further comprises code to automatically enable said disabling feature with respect to said safety concern if said mobile telecommunications is out of said range of said multifunction device.

14. The non-transitory computer-readable medium of claim 12 wherein said code further comprises code to automatically enable and disable said disabling feature based on said proximity range to facilitate a user interface access to said multifunction device so long as said user interface is within a visual range of said multifunction device.

* * * * *